(12) United States Patent
Schwartz et al.

(10) Patent No.: US 12,474,238 B2
(45) Date of Patent: Nov. 18, 2025

(54) HIGH THROUGHPUT MATERIALS SCREENING

(71) Applicant: LAWRENCE LIVERMORE NATIONAL SECURITY, LLC, Livermore, CA (US)

(72) Inventors: Johanna Jesse Schwartz, Livermore, CA (US); Marissa Wood, Oakland, CA (US); Jianchao Ye, Tracy, CA (US); Adam W. Jaycox, Livermore, CA (US); Xiaoting Zhong, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 403 days.

(21) Appl. No.: 17/932,723

(22) Filed: Sep. 16, 2022

(65) Prior Publication Data

US 2024/0091808 A1    Mar. 21, 2024

(51) Int. Cl.
*G01N 1/28* (2006.01)
*B05D 1/26* (2006.01)
(Continued)

(52) U.S. Cl.
CPC .............. *G01N 1/2813* (2013.01); *B05D 1/26* (2013.01); *H01M 6/40* (2013.01);
(Continued)

(58) Field of Classification Search
CPC ......... G01N 1/2813; B05D 1/26; H01M 6/40; H01M 10/0562; H01M 10/0565; H01M 2300/0082
(Continued)

(56) References Cited

U.S. PATENT DOCUMENTS 4,606,648 A * 8/1986 Coyle .................... B01F 35/21
366/300
4,906,577 A * 3/1990 Armstrong ............ C12M 23/38
435/295.3
(Continued)

FOREIGN PATENT DOCUMENTS

EP       3747571 A1 * 12/2020 .............. B22F 10/20
KR    102226094 B1 *  3/2021 .............. B22F 3/105
(Continued)

OTHER PUBLICATIONS

Levi et al., In Situ Porous Structure Characterization of Electrodes for Energy Storage and Conversion by EQCM-D: a Review, Electrochimica Acta 232 (2017) 271-284 (Year: 2017).*

(Continued)

*Primary Examiner* — Stephanie E Bloss
*Assistant Examiner* — Kevin C Butler
(74) *Attorney, Agent, or Firm* — HARNESS, DICKEY & PIERCE, P.L.C.

(57) ABSTRACT

Screening for screening a material includes: providing active mixing direct-ink-writing of the material, providing in situ characterization substrates or probes that receive the material, and providing active learning planning for screening the material. The providing active mixing direct-ink-writing of the material prints five to ten films. The providing in situ characterization substrates or probes includes printing five to ten films on the substrates or probes with a first set of constituents. The providing active learning planning for screening the material includes providing machine learning that takes the first set of constituents and uses the first set of constituents to dictate a next batch of films to achieve improved additional sets of constituents.

27 Claims, 9 Drawing Sheets

(51) Int. Cl.
*H01M 6/40* (2006.01)
*H01M 10/0562* (2010.01)
*H01M 10/0565* (2010.01)

(52) U.S. Cl.
CPC ... *H01M 10/0562* (2013.01); *H01M 10/0565* (2013.01); *H01M 2300/0082* (2013.01)

(58) Field of Classification Search
USPC ........................................................ 73/150 R
See application file for complete search history.

(56) References Cited

U.S. PATENT DOCUMENTS

| | | | | |
|---|---|---|---|---|
| 10,071,350 | B2 * | 9/2018 | Lewis | B28C 5/1292 |
| 10,375,765 | B2 * | 8/2019 | Chaffins | H05K 1/16 |
| 10,406,801 | B2 * | 9/2019 | Bell | B33Y 10/00 |
| 10,710,301 | B2 * | 7/2020 | Feng | B33Y 30/00 |
| 10,717,232 | B2 * | 7/2020 | Feng | B33Y 10/00 |
| 10,857,778 | B2 * | 12/2020 | Mantha | B29C 64/106 |
| 10,926,464 | B2 * | 2/2021 | Chaffins | B33Y 80/00 |
| 10,967,559 | B2 * | 4/2021 | Huang | B33Y 80/00 |
| 11,090,862 | B2 * | 8/2021 | Chaffins | H05K 1/095 |
| 11,123,895 | B2 * | 9/2021 | Heng | B28B 1/001 |
| 11,123,930 | B2 * | 9/2021 | Bheda | B33Y 50/02 |
| 11,559,607 | B2 * | 1/2023 | Kolesky | A01N 1/16 |
| 11,858,039 | B2 * | 1/2024 | Sajadi | B22F 12/55 |
| 11,867,644 | B2 * | 1/2024 | Ros | B33Y 80/00 |
| 11,910,931 | B2 * | 2/2024 | Achten | B33Y 30/00 |
| 11,911,825 | B2 * | 2/2024 | Erickson | B29C 70/882 |
| 12,037,603 | B2 * | 7/2024 | Retting | C12N 5/0656 |
| 12,115,697 | B2 * | 10/2024 | Heng | B29C 64/209 |
| 2003/0085267 | A1 * | 5/2003 | Piotrowski | G06Q 30/02 235/375 |
| 2003/0230138 | A1 * | 12/2003 | Bast | C23C 16/52 73/150 R |
| 2016/0346997 | A1 * | 12/2016 | Lewis | B33Y 80/00 |
| 2017/0326867 | A1 * | 11/2017 | Hartke | B29C 64/153 |
| 2018/0071868 | A1 * | 3/2018 | Goehler | B29C 64/153 |
| 2018/0133670 | A1 * | 5/2018 | Lewis | B01F 23/53 |
| 2020/0223146 | A1 * | 7/2020 | Totzeck | B29C 64/188 |
| 2020/0384693 | A1 * | 12/2020 | Bennett | B33Y 50/02 |
| 2021/0197279 | A1 * | 7/2021 | Sohn | B23K 26/144 |
| 2022/0266522 | A1 * | 8/2022 | Jackson | B22F 12/43 |

FOREIGN PATENT DOCUMENTS

| | | | | |
|---|---|---|---|---|
| WO | WO-2014209994 | A2 * | 12/2014 | B29C 64/00 |
| WO | WO-2015069619 | A1 * | 5/2015 | A61F 2/06 |
| WO | WO-2015073944 | A2 * | 5/2015 | G01L 1/18 |
| WO | WO-2015120429 | A1 * | 8/2015 | B29C 64/106 |
| WO | WO-2016082810 | A1 * | 6/2016 | B23K 26/342 |
| WO | WO-2016164562 | A1 * | 10/2016 | B01F 13/0059 |
| WO | WO-2018091091 | A1 * | 5/2018 | B29C 64/393 |
| WO | WO-2018234331 | A1 * | 12/2018 | B22F 10/28 |

OTHER PUBLICATIONS

Krueger et al., Solid Electrolyte Interphase Evolution on Lithium Metal Electrodes Followed by Scanning Electrochemical Microscopy Under Realistic Battery Cycling Current Densities, ChemElectroChem, ChemElectroChem 2020, 7, 3590-3596 (Year: 2020).*

Silau et al., Weibull Analysis of Electrical Breakdown Strength as an Effective Means of Evaluating Elastomer Thin Film Quality, Advanced Engineering Materials, 20(9), Article 1800241. https://doi.org/10.1002/adem.201800241, (2018), 23 pg(s) (Year: 2018).*

Taylor et al., An insight into the errors and uncertainty of the lithium-ion battery characterisation experiments, Elsevier., 2019, 24 pg(s) (Year: 2019).*

* cited by examiner

HIGH THROUGHPUT MATERIALS SCREENING

BACKGROUND

Field of Endeavor

The present application relates to materials screening and more particularly to high throughput materials screening.

State of Technology

This section provides background information related to the present disclosure which is not necessarily prior art.

Polymer materials formulation and optimization has been generally limited to mixing by hand, as polymers have a wide range of viscosities. A high throughput approach is therefore needed to enable faster screening of polymers optimized for targeted applications. Systems that mix multi-materials with disparate viscosities are known [Example U.S. Pat. No. 10,071,350]. The inventors have developed active mixing direct-ink-write (DIW) additive manufacturing to facilitate the 3D printing of multi-material films. The inventors have developed an automated platform for materials by coupling mixing systems with in-situ characterization systems combined with machine learning systems.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

Applicant's apparatus, systems, and methods provide screening for screening a material that includes providing active mixing direct-ink-writing of the material, providing in situ characterization substrates or probes that receive the material, and providing active learning planning for screening the material. The providing active mixing direct-ink-writing of the material prints multiple films. In one embodiment the providing active mixing direct-ink-writing of the material prints five to ten films. In another embodiment the providing active mixing direct-ink-writing of the material prints one to twenty films. The providing in situ characterization substrates or probes includes printing multiple films on the substrates or probes with a first set of constituents. The providing active learning planning for screening the material includes providing machine learning that takes the first set of constituents and uses the first set of constituents to dictate a next batch of films to achieve improved additional sets of constituents.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1A:
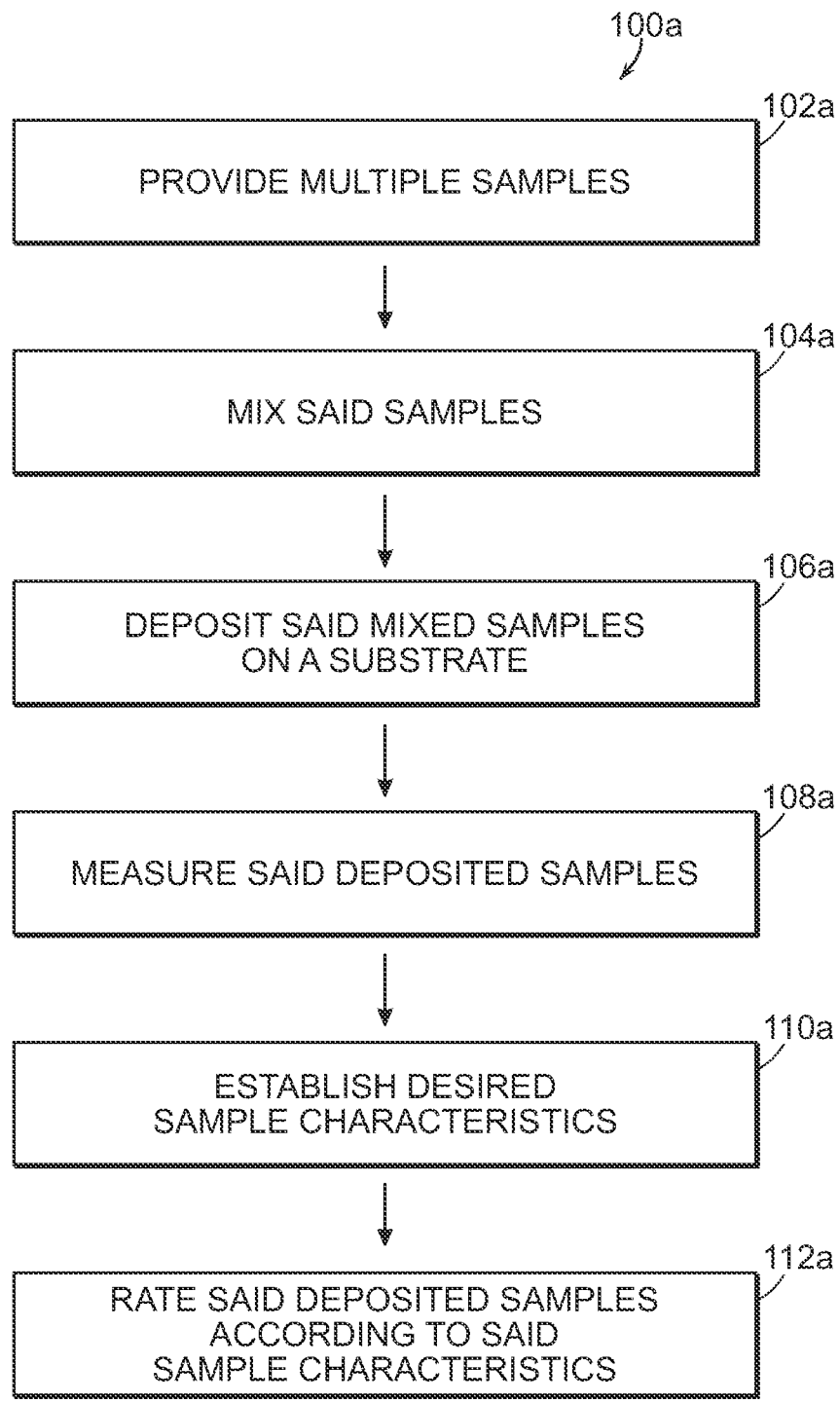
FIG. 1A is a flowchart that illustrates one embodiment of a screening method for screening a material.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Applicant's apparatus, systems, and methods provide active-mixing direct ink write additive manufacturing enable mixing of materials with highly disparate viscosities, from liquids to pastes. By coupling this mixing system with in-situ characterization methods with machine learning experimental planning systems, the inventors have developed an automated platform for materials discovery and optimization. This system can handle complex hybrid formulations, including but not limited to solvents, monomers, oligomers, polymers, and additives. Additives can be liquid or solid, including particles (nano and micro) of organic compounds, metals, salts, glasses, ceramics, conducting materials, and more. In-situ characterization, either through a probe or substrate matrix, enables the homing-in on desirable properties for target applications using active learning experimental planning software to vary the composition during the printing process.

Referring now to the drawings and in particular to FIG. 1A, an illustrative view shows an embodiment of Applicant's apparatus, systems, and methods. This embodiment is identified generally by the reference numeral 100*a*. FIG. 1A is a flowchart that illustrates a screening method for screening a material. The component steps of Applicant's method 100*a* illustrated in FIG. 1A are listed below:

Reference Numeral No. 102*a*—provide multiple samples,
Reference Numeral No. 104*a*—mix said samples,
Reference Numeral No. 106*a*—deposit said mixed samples on a substrate,
Reference Numeral No. 108*a*—measure said deposited samples,
Reference Numeral No. 110*a*—establish desired sample characteristics, and
Reference Numeral No. 112*a*—rate said deposited samples according to said sample characteristics.

The description of the steps of the Applicant's material screening method 100*a* having been completed, the operation and additional description of the Applicant's apparatus, systems, and methods will now be considered in greater detail.

The screening method 100*a* includes the steps of providing active mixing direct-ink-writing of the material, providing in situ characterization substrates or probes containing the material, and providing active learning planning for screening the material. The step of providing active mixing direct-ink-writing of the material prints five to ten films. The step of providing in situ characterization substrates or probes includes printing multiple films on the substrates or probes with the multiple films having a first set of constituents. For example, the step of providing in situ characterization substrates or probes can include printing five to ten films on the substrates or probes with the five to ten films having a first set of constituents. In another example, the step of providing in situ characterization substrates or probes includes printing one to twenty films on the substrates or probes with the one to twenty films having a first set of constituents.

The step of providing active learning planning for screening the material includes providing machine learning that takes the first set of constituents and uses the first set of constituents to dictate a next batch of films to achieve improved additional sets of constituents. As illustrated in FIG. 1A step 102*a* provides multiple samples. Step 104*a* mixes the samples. Step 106*a* deposits the mixed samples on a substrate. Step 108*a* measures the deposited samples. Step 110*a* establishes desired sample characteristics. Step 112*a* rates the deposited samples according to said sample characteristics.

Figure 1B:
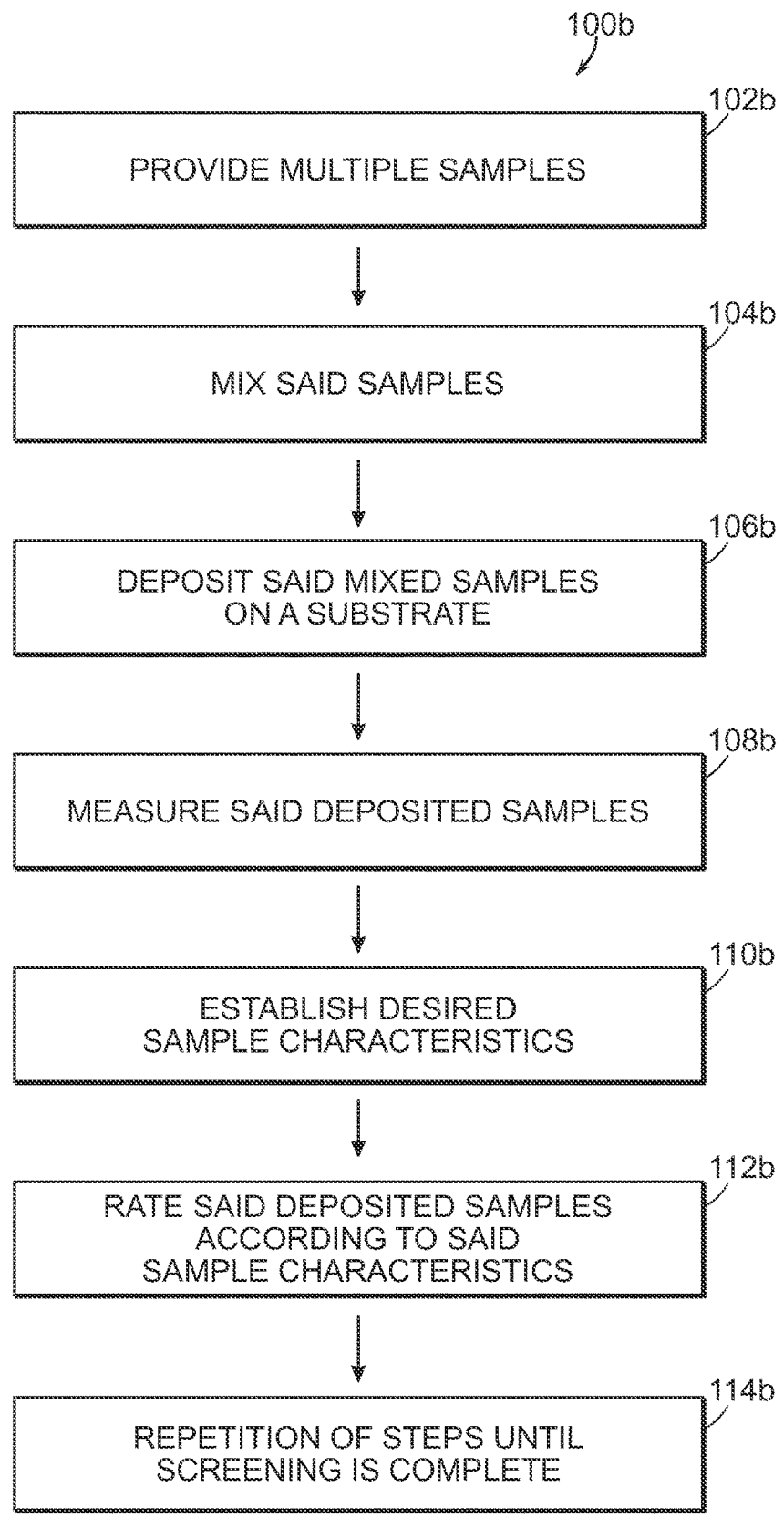
FIG. 1B is a flowchart that illustrates another embodiment of a screening method for screening a material.

Referring now to FIG. 1B, an illustrative view shows another embodiment of Applicant's apparatus, systems, and methods. This embodiment is identified generally by the reference numeral 100*b*. FIG. 1B is a flowchart that illustrates a screening method for screening a material. The component steps of Applicant's method 100*b* illustrated in FIG. 1B are listed below:

Reference Numeral No. 102*b*—provide multiple samples,
Reference Numeral No. 104*b*—mix said samples,
Reference Numeral No. 106*b*—deposit said mixed samples on a substrate,
Reference Numeral No. 108*b*—measure said deposited samples,
Reference Numeral No. 110*a*—establish desired sample characteristics,
Reference Numeral No. 112*b*—rate said deposited samples according to said sample characteristics,
Reference Numeral No. 114*b*—repetition of steps until screening is completed.

The description of the steps of the Applicant's material screening method 100*b* having been completed, the operation and additional description of the Applicant's apparatus, systems, and methods will now be considered in greater detail.

The screening method 100*b* includes the steps of providing active mixing direct-ink-writing of the material, providing in situ characterization substrates or probes containing the material, and providing active learning planning for screening the material. The step of providing active mixing direct-ink-writing of the material prints five to ten films. The step of providing in situ characterization substrates or probes includes printing multiple films on the substrates or probes with the multiple films having a first set of constituents. For example, the step of providing in situ characterization substrates or probes can include printing five to ten films on the substrates or probes with the five to ten films having a first set of constituents. In another example, the step of providing in situ characterization substrates or probes includes printing one to twenty films on the substrates or probes with the one to twenty films having a first set of constituents.

The step of providing active learning planning for screening the material includes providing machine learning that takes the first set of constituents and uses the first set of constituents to dictate a next batch of films to achieve improved additional sets of constituents. As illustrated in FIG. 1B step 102*b* provides multiple samples. Step 104*b* mixes the samples. Step 106*b* deposits the mixed samples on a substrate. Step 108*b* measures the deposited samples. Step 110*b* establishes desired sample characteristics. Step 112*b* rates the deposited samples according to said sample characteristics. Step 114*b* repeats the steps until screening is completed.

Figure 2:
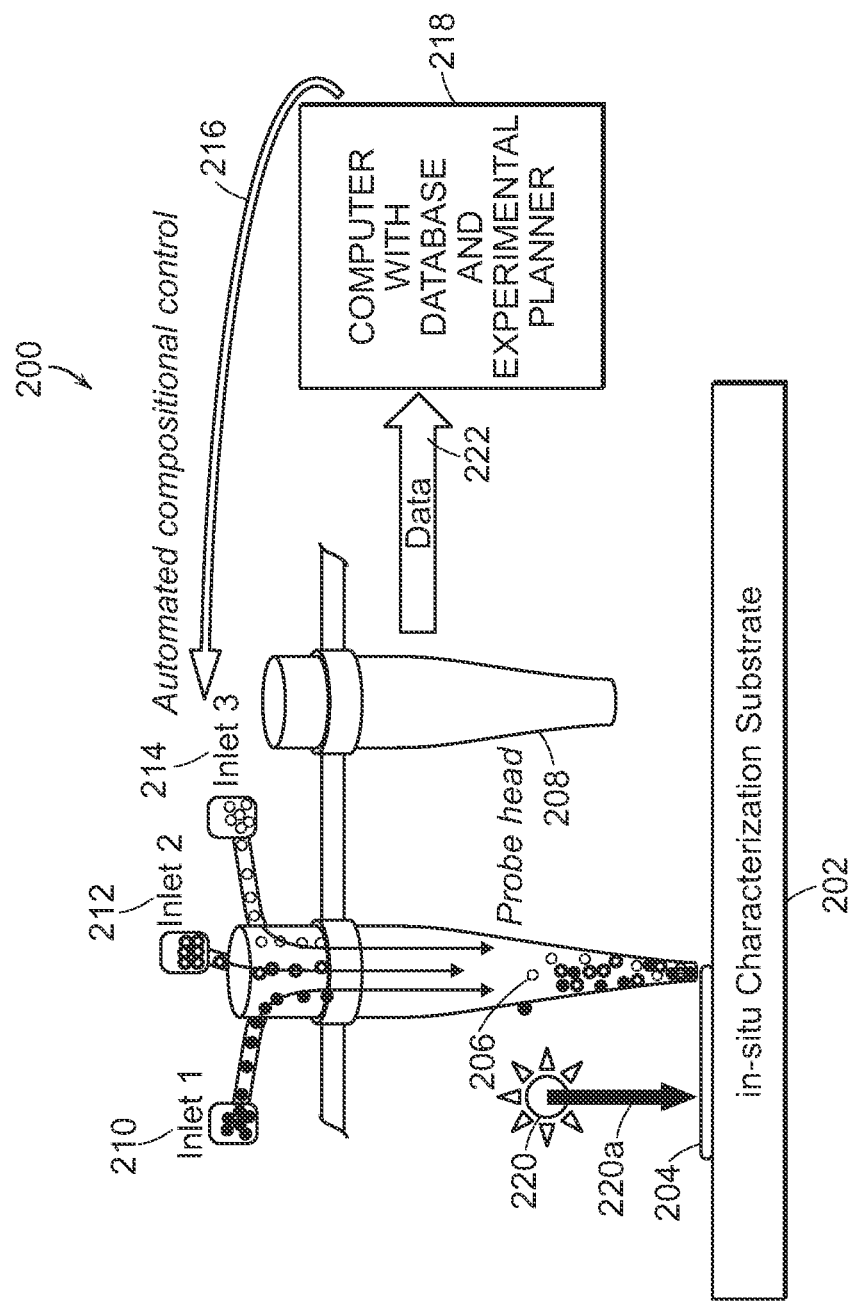
FIG. 2 is an illustration of Applicant's apparatus, systems, and methods that involve three main components: Formulations loading and mixing, Deposition and measurement, and Analysis and experimental planning.

Referring now to FIG. 2, an illustrative view shows another embodiment of Applicant's apparatus, systems, and methods. This embodiment is identified generally by the reference numeral 200. The components of Applicant's apparatus, systems, and methods 200 illustrated in FIG. 2 are listed below:

Reference Numeral No. 202—In-situ Characterization Substrate,
Reference Numeral No. 204—Deposited Formulation,
Reference Numeral No. 206—Mixing and Deposit Head,
Reference Numeral No. 208—Probe Head,
Reference Numeral No. 210—Inlet 1,
Reference Numeral No. 212—Inlet 2,
Reference Numeral No. 214—Inlet 3,
Reference Numeral No. 216—Automated Computational Control,
Reference Numeral No. 218—Computer,
Reference Numeral No. 220—Photocuring light source,
Reference Numeral No. 220*a*—Photocuring light, and
Reference Numeral No. 222—Data from Probe Head.

The description of the structural components of the Applicants' apparatus, systems, and methods 200 having been completed, the operation and additional description of the Applicant's apparatus, systems, and methods will now be considered in greater detail. Applicant's apparatus, systems, and methods 200 involve three main components: (1) Formulations loading and mixing, (2) Deposition and measurement, and (3) Analysis and experimental planning.

General Description of Operation of FIG. 2

Load test samples into inlets 210, 212, and 214.
Mix 206 and deposit 204 films in batches.

Cure materials onto substrate 202 using photocuring light 220a.

Measure impedance through contact between probe 208 and In-situ Characterization Substrate 202.

Record data of batch of test samples on computer 218.

Automated software 218 takes data from previous batches to dictate next batch printed 216.

Repeat until done (when substrate is filled or no more space—Applicant contemplates up to 100 samples in a single screening).

More Detailed Description of Operation of FIG. 2

Prior to deposition, sample materials of interest are first loaded into the inlets 210, 212, and 214. Note that FIG. 2 shows three inlets; however, more inlets are contemplated and only three are shown for illustrative purposes. Each of these inlets will include samples. Examples of the samples include polymer electrolyte resin formulations including components such as solvents, monomers, oligomers, polymers, initiators and curing agents, salts, stabilizers, plasticizers, and solid additives such as silica, ceramics, nanoparticles, and metals. Once the inlets 210, 212, 214 are loaded, deposited sample composition 204 is controlled through the apparatus, varying the ratio between inlets into the deposition nozzle 206. The ratios of inlets can be kept constant or varied throughout testing, producing deposited materials with homogeneous, heterogenous, and graded compositions. Mixing of the components within the deposition nozzle 206 can be achieved through static or active mixing techniques. Active mixing techniques are illustrated in FIG. 2 and utilize a rotating mixing shaft within the mixing head to shear mix the inlet materials. Active mixing is generally chosen for polymer electrolytes, as homogenous mixing of formulations with viscosities ranging from liquids to gels and pastes is possible. The rotational rate of the mixing shaft, coupled with the feed rate of inlets, impacts the mixing time and turbidity within the system, and thereby the homogeneity of 204. The deposition nozzle 206 may include shear, pressure, and thermal inputs to enable deposition and analysis of the mixed resin formulations 204.

Mixed formulations are then deposited 204 onto a substrate 202. Deposited samples can include liquids, gels pastes, and thermoplastics. With the inclusion of crosslinkers, the formulations can be cured using photo, thermal, chemical, or other curing mechanisms. In the case of polymer electrolyte formulations, traditional photocuring methods are used through the inclusion of a light 220a during printing. Curing enables the deposition of multiple stacked layers, and the apparatus can handle thin film and three-dimensional structures depending on the application. For screening, thin films are generally targeted. In the case of system 200, polymer electrolyte measurements are focused on impedance characterization. With contact between the two point probe head 208 and the electrode connections on the substrate 202, electrical impedance spectroscopy measurements are made traditionally from frequencies of 7 MHz to 100 mHz. Ranges of 35 MHz to 1 uHz are possible. Over twelve measurements are possible for a single film, moving the probe head around on the substrate to varying electrode connections and locations on the deposited material spatially. Traditionally, 4-6 spatial measurements are done for each film. Measurements are done in triplicate, and the average of all measurements for one film is used and recorded in the database for the sample for comparison. Additional probe heads and substrates contemplated in the system 200 include, optical metrology and imaging, stress sensing, chemical compositional analysis, fluorescence, pH, and environmental measurements (temperature, humidity). In addition, probe head 208 and substrates 202 can be utilized to align and interact with deposited materials. This includes electromagnetic alignment of particles, electrochemical and surface chemistry interactions, and photo or thermal curing and interactions. Probe head 208 and substrate 202 inputs and measurement 220 information are controlled and recorded as data within the computer and its respective software 218. This data is kept for each print and formulation tested.

The experimental planner for this system 200 is used to control the inlet feed ratios during screening. Between tests, machine learning models that are used in the apparatus software are improved through analysis of the full living database of previous test materials screened. Machine learning models include, but are not limited to Bayesian optimization, random forest, and Gaussian processing, as well as large data models including neural networks. During deposition and testing, the latest model is used to analyze the data from previous batches of testing. From this data, a new batch of formulations to test is generated, and printing continues. This new batch data is coupled to the previous batches to create the following batch. In other words. all data generated during a test is used to make the new batch of testing, until testing is completed. Then this data is once again added to the database and used to improve the experimental planner. Critically, this planner enables full automation of the materials formulation screening, homing in on desirable properties from the characterization and measurement data during testing.

Example of Polymer Electrolyte Printing

1) Material formulations are made using any combination of the following components: solvent, monomer, oligomer, polymer, crosslinkers, salts, photoinitiators, catalysts, stabilizers, dyes, liquid additives and solid additives. Viscosities from liquids to high viscosity gels and pastes are possible.
2) Formulations are loading into inlet syringes, and motor ratios are used to control the varying composition. Two to four different syringe inlets are possible, with traditional testing using two syringes to vary a single variable. Example variables include salt concentration, additive concentration, and polymer additive concentration.
3) Inlet materials are mixed in the mixing body and deposited onto the impedance characterization substrate. The rotational speed and pressure dictate turbidity, deposition rate, and homogeneity of the formulations. Samples are generally printed at a fixed motor feed ratio (fixed composition), switch compositions between samples in a given test. 1-100 samples are possible in a single run. Samples may also be graded or heterogeneous, switching ratios mid print. A dump region is used to switch between different compositions between samples.
4) UV or blue light is traditionally used to cure the samples during printing. Thermal, electrochemical, and catalytic curing methods are also possible.
5) After curing, a probe head connected to the potentiostat is lowered to touch the electrical connections on the substrate. The deposition nozzle is aligned such that it lowers into a dump zone, or a hole in the board, to begin the transition to the next formulation and remove the unwanted mix volume. With contact between the two point probe head and the electrode connections on the substrate, electrical impedance spectroscopy measurements are made traditionally from frequencies of 7 MHz to 100 mHz. Ranges of 35 MHz to 1 uHz are possible. Over twelve measurements are possible for a single film, moving the probe head around on the substrate to varying electrode connections. Traditionally, 4-6 spatial measurements are done for each film. Measurements are done in triplicate, and the average of all measurements for one film is used and recorded in the database for the sample for comparison.

6) In addition to impedance measurements, confocal machine vision techniques are used to measure the height of films as deposited. These, in conjunction with images of the samples from above, and profilometry data (after deposition end), are used to train a machine learning model to accurately measure the height of the sample. These height measurements are used to generate corrected ionic conductivity measurements for each sample from the raw impedance measurements.

7) The average data from a batch of runs is then inputted into the experimental planning model, which uses this data to identify regions of uncertainty and interest. These regions are used to generate the deposition file for next batch of formulations tested.

8) This process continues (steps 3-7) until the board is filled with samples and deposition concludes. After testing, identified films with high ionic conductivities are characterized further electrochemically and thermomechanically. This data is also included in the database.

9) In between testing, the experimental planning models are trained with all existing datasets and updated for the next round of testing.

The experimental planner 200 that controls the inlet feed ratios during screening is implemented with machine learning models. The machine learning models include, but are not limited to small-data models like Gaussian Processes and Random Forest Ensembles, as well as large-data models like feed-forward Neural Networks. The exact machine learning model in use depends on the available data. These machine learning models are first trained with some initial test data, and then improved between tests when new materials are screened and the living materials database grows. Specifically, during deposition and testing, some batches of data are produced at the beginning. Machine learning models are trained using these initial batches of data and predict a new batch of formulations to print. A new batch of samples are printed for the predicted formulations and corresponding data is collected. This new batch of data is coupled to the previous batches to generate the following batch for further testing. In other words, all data generated during a test is used to make the new batch of testing, until testing is completed. Then this data is once again added to the database and used to improve the experimental planner between tests. Critically, this planner enables full automation of the materials formulation screening, homing in on desirable properties from the characterization and measurement data during testing.

Automated High Throughput Polymer Electrolyte Screening

Figure 3:
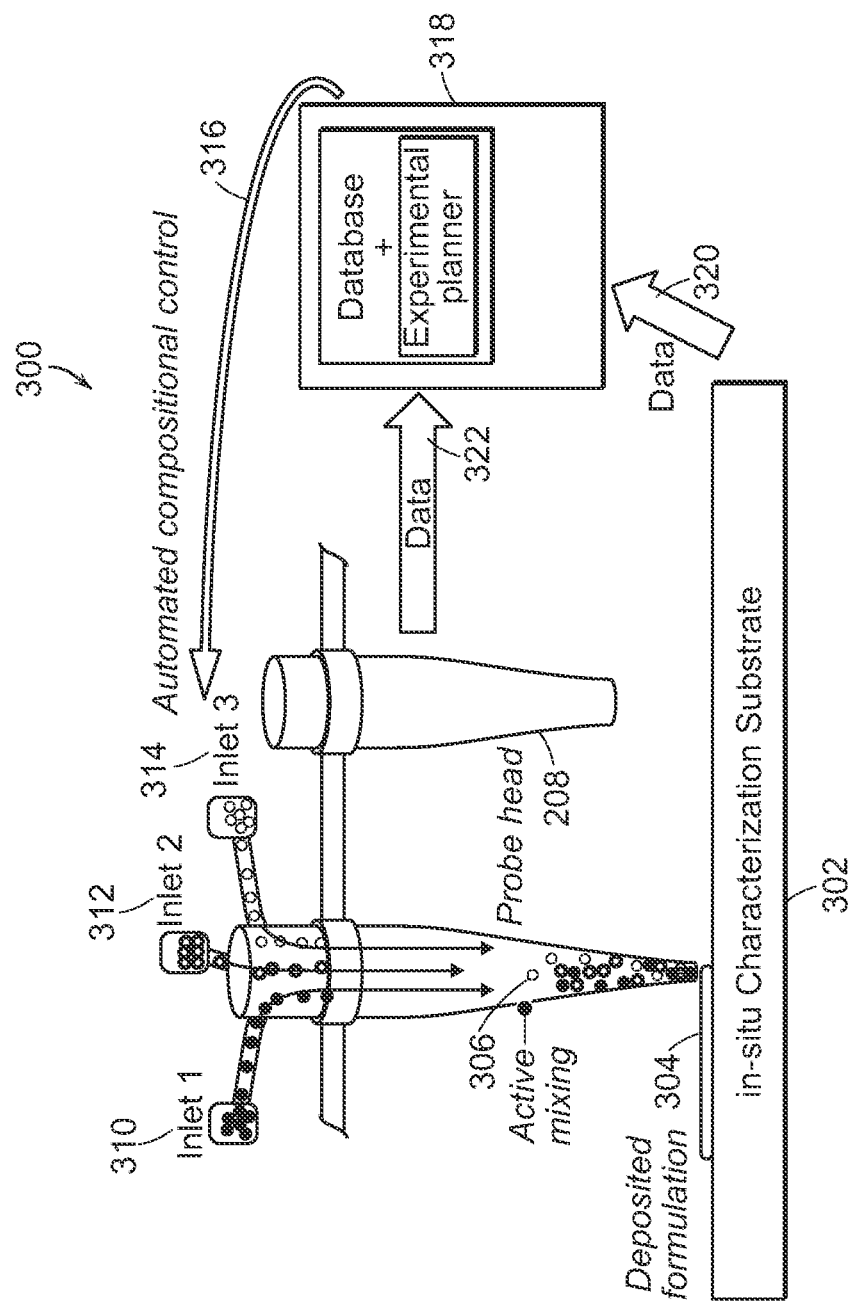
FIG. 3 is an illustration of automated high throughput polymer electrolyte screening.

Referring now to FIG. 3, an illustrative view shows an embodiment of Applicant's apparatus, systems, and methods. This embodiment is identified generally by the reference numeral 300. The components of Applicant's apparatus, systems, and methods 300 illustrated in FIG. 3 are listed below:

Reference Numeral No. 302—In-situ Characterization Substrate,
Reference Numeral No. 304—Deposited Formulation,
Reference Numeral No. 306—Mixing and Deposit Head,
Reference Numeral No. 308—Probe Head,
Reference Numeral No. 310—Inlet 1,
Reference Numeral No. 312—Inlet 2,
Reference Numeral No. 314—Inlet 3,
Reference Numeral No. 316—Automated Compositional Control,
Reference Numeral No. 318—Computer with database and experimental planner,
Reference Numeral No. 320—Data from Substrate, and
Reference Numeral No. 322—Data from Probe Head.

The description of the structural components of the Applicants' apparatus, systems, and methods 300 having been completed, the operation and additional description of the Applicant's apparatus, systems, and methods will now be considered in greater detail. Applicant's apparatus, systems, and methods 300 involve three main components: (1) Formulations loading and mixing, (2) Deposition and measurement, and (3) Analysis and experimental planning.

General Description of Operation of FIG. 3

Load test samples into inlets 310, 312, and 314.
Mix 306 and deposit 304 films in batches.
Data from Probe Head 322 and Data from Substrate 320 are sent to Computer with database and experimental planner 318.
Measure characteristic of interest through contact between probe 308 and In-situ Characterization.
Record data of batch of test samples on computer 318.
Automated software 318 takes data from previous batches to dictate next batch printed 316.
Repeat until done (when substrate is filled or no more space—Applicant contemplates up to 100 samples in a single screening).

More Detailed Description of Operation of FIG. 3

Prior to deposition, sample materials of interest are first loaded into the inlets 310, 312, and 314. Note that FIG. 3 shows three inlets; however, more inlets are contemplated and only three are shown for illustrative purposes. Each of these inlets will include samples. Examples of the samples include polymer electrolyte resin formulations including components such as solvents, monomers, oligomers, polymers, initiators and curing agents, salts, stabilizers, plasticizers, and solid additives such as silica, ceramics, nanoparticles, and metals. Once the inlets 310, 312, 314 are loaded, deposited sample composition 304 is controlled through the apparatus, varying the ratio between inlets into the deposition nozzle 306. The ratios of inlets can be kept constant or varied throughout testing, producing deposited materials with homogeneous, heterogenous, and graded compositions. Mixing of the components within the deposition nozzle 306 can be achieved through static or active mixing techniques. Active mixing techniques are illustrated in FIG. 3 and utilize a rotating mixing shaft within the mixing head to shear mix the inlet materials. Active mixing is generally chosen for polymer electrolytes, as homogenous mixing of formulations with viscosities ranging from liquids to gels and pastes is possible. The rotational rate of the mixing shaft, coupled with the feed rate of inlets, impacts the mixing time and turbidity within the system, and thereby the homogeneity of 304. The deposition nozzle 306 may include shear, pressure, and thermal inputs to enable deposition and analysis of the mixed resin formulations 304.

Mixed formulations are then deposited 304 onto a substrate 302. Deposited samples can include liquids, gels pastes, and thermoplastics. With the inclusion of crosslinkers, the formulations can be cured using photo, thermal, chemical, or other curing mechanisms. For screening, thin films are generally targeted. In the case of system 300, polymer electrolyte measurements are focused on impedance characterization. With contact between the two point probe head 308 and the electrode connections on the substrate 302, electrical impedance spectroscopy measurements are made traditionally from frequencies of 7 MHz to 100 mHz. Ranges of 35 MHz to 1 uHz are possible. Over twelve measurements are possible for a single film, moving the probe head around on the substrate to varying electrode connections and locations on the deposited material spatially. Traditionally, 4-6 spatial measurements are done for each film. Measurements are done in triplicate, and the average of all measurements for one film is used and recorded in the database for the sample for comparison. Additional probe heads and substrates contemplated in the system 300 include, optical metrology and imaging, stress sensing, chemical compositional analysis, fluorescence, pH, and environmental measurements (temperature, humidity). In addition, probe head 308 and substrates 302 can be utilized to align and interact with deposited materials. This includes electromagnetic alignment of particles, electrochemical and surface chemistry interactions, and photo or thermal curing and interactions. Probe head 308 and substrate 302 inputs and measurement 320 information are controlled and recorded as data within the computer and its respective software 318. This data is kept for each print and formulation tested.

The experimental planner for this system 300 is used to control the inlet feed ratios during screening. Between tests, machine learning models that are used in the apparatus software are improved through analysis of the full living database of previous test materials screened. Machine learning models include, but are not limited to Bayesian optimization, random forest, and Gaussian processes, as well as large data models including neural networks. During deposition and testing, the latest model is used to analyze the data from the initial batches of testing. From this data, a new batch of formulations to test is generated, and printing continues. This new batch data is coupled to the previous batches to generate the following batch for further screening. In other words. all data generated during a test is used to make the new batch of testing, until testing is completed. Then this data is once again added to the database and used to improve the experimental planner. Critically, this planner enables full automation of the materials formulation screening, homing in on desirable properties from the characterization and measurement data during testing.

Example of Polymer Electrolyte Printing

Step 1—Material formulations are made using any combination of the following components: solvent, monomer, oligomer, polymer, crosslinkers, salts, photoinitiators, catalysts, stabilizers, dyes, liquid additives and solid additives. Viscosities from liquids to high viscosity gels and pastes are possible.

Step 2—Formulations are loading into inlet syringes, and motor ratios are used to control the varying composition. Two to four different syringe inlets are possible, with traditional testing using two syringes to vary a single variable. Example variables include salt concentration, additive concentration, and polymer additive concentration.

Step 3—Inlet materials are mixed in the mixing body and deposited onto the impedance characterization substrate. The rotational speed and pressure dictate turbidity, deposition rate, and homogeneity of the formulations. Samples are generally printed at a fixed motor feed ratio (fixed composition), switch compositions between samples in a given test. 1-100 samples are possible in a single run. Samples may also be graded or heterogeneous, switching ratios mid print. A dump region is used to switch between different compositions between samples.

Step 4—UV or blue light is traditionally used to cure the samples during printing. Thermal, electrochemical, and catalytic curing methods are also possible.

Step 5—After curing, a probe head connected to the potentiostat is lowered to touch the electrical connections on the substrate. The deposition nozzle is aligned such that it lowers into a dump zone, or a hole in the board, to begin the transition to the next formulation and remove the unwanted mix volume. With contact between the two point probe head and the electrode connections on the substrate, electrical impedance spectroscopy measurements are made traditionally from frequencies of 7 MHz to 100 mHz. Ranges of 35 MHz to 1 uHz are possible. Over twelve measurements are possible for a single film, moving the probe head around on the substrate to varying electrode connections. Traditionally, 4-6 spatial measurements are done for each film. Measurements are done in triplicate, and the average of all measurements for one film is used and recorded in the database for the sample for comparison.

Step 6—In addition to impedance measurements, confocal machine vision techniques are used to measure the height of films as deposited. These, in conjunction with images of the samples from above, and profilometry data (after deposition end), are used to train a machine learning model to accurately measure the height of the sample. These height measurements are used to generate corrected ionic conductivity measurements for each sample from the raw impedance measurements.

Step 7—The average data from a batch of runs is then inputted into the experimental planning model, which uses this data to identify regions of uncertainty and interest. These regions are used to generate the deposition file for next batch of formulations tested.

Step 8—This process continues (steps 3-7) until the board is filled with samples and deposition concludes. After testing, identified films with high ionic conductivities are characterized further electrochemically and thermomechanically. This data is also included in the database.

Step 9—In between testing, the experimental planning models are trained with all existing datasets and updated for the next round of testing.

The experimental planner 300 that controls the inlet feed ratios during screening is implemented with machine learning models. The machine learning models include, but are not limited to small-data models like Gaussian Processes and Random Forest Ensembles, as well as large-data models like feed-forward Neural Networks. The exact machine learning model in use depends on the available data. These machine learning models are first trained with some initial test data, and then improved between tests when new materials are screened and the living materials database grows. Specifically, during deposition and testing, some batches of data is produced at the beginning. Machine learning models are trained using these initial batches of data and predicts a new batch of formulations to print. A new batch of samples are printed for the predicted formulations and corresponding data is collected. This new batch of data is coupled to the previous batches to create the following batch. In other words, all data generated during a test is used to make the new batch of testing, until testing is completed. Then this data is once again added to the database and used to improve the experimental planner between tests. Critically, this planner enables full automation of the materials formulation screening, homing in on desirable properties from the characterization and measurement data during testing.

Tuning Mechanical Strength 3D Printed Materials Screening

Figure 4:
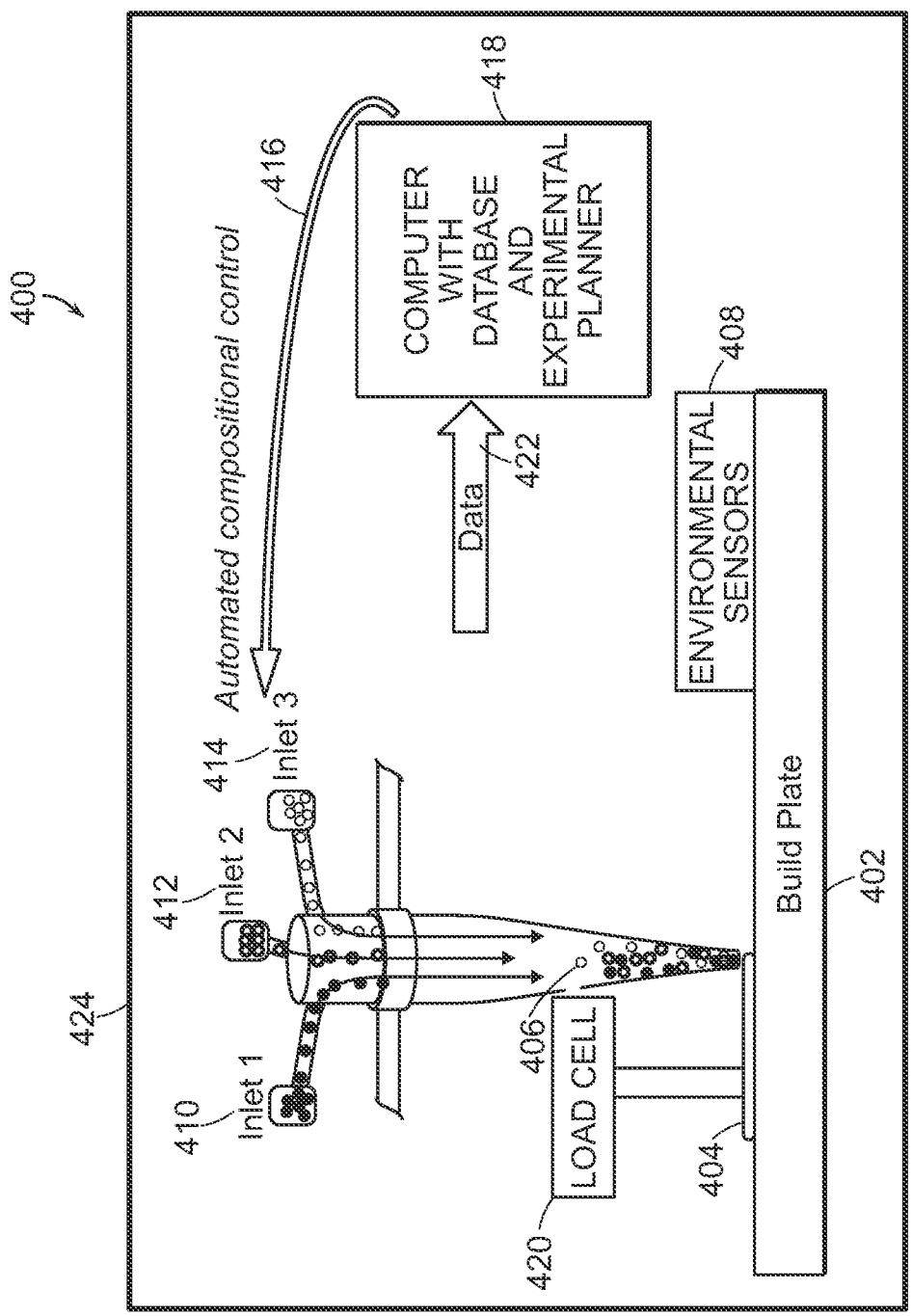
FIG. 4 is an illustration of tuning mechanical strength 3D printed materials screening.

Referring now to FIG. 4, an illustrative view shows yet another embodiment of Applicant's apparatus, systems, and methods. This embodiment is identified generally by the reference numeral 400. The components of Applicant's apparatus, systems, and methods 400 illustrated in FIG. 4 are listed below:
Reference Numeral No. 402—Build Plate,
Reference Numeral No. 404—Deposited Formulation,
Reference Numeral No. 406—Mixing and Deposit Head,
Reference Numeral No. 408—Environmental Sensors,
Reference Numeral No. 410—Inlet 1,
Reference Numeral No. 412—Inlet 2,
Reference Numeral No. 414—Inlet 3,
Reference Numeral No. 416—Automated Compositional Control,
Reference Numeral No. 418—Computer with database and experimental planner,
Reference Numeral No. 420—Load Cell, and
Reference Numeral No. 422—Data from Probe Head and Load Cell and Environmental Sensors.
Reference Numeral No. 424—Controlled environment The description of the structural components of the Applicants' apparatus, systems, and methods 400 having been completed, the operation and additional description of the Applicant's apparatus, systems, and methods will now be considered in greater detail.

General Description of Operation of FIG. 4

Applicants' apparatus, systems, and methods 400 provides tuning mechanical strength 3D printed materials screening.

Test sample formulations are loaded into inlets 410, 412, and 414. The deposited sample 404 can be test films or 3D samples.

The test sample formulations are mixed in the nozzle and deposit head 406 and the test samples are deposited on the build plate 404 providing test films or samples in batches. Deposited samples may be standalone materials, or may be cured during or after deposition through stimulus such as electromagnetic irradiation, acoustic wave, electric current, heat, and chemical crosslinking or interactions. Traditionally, light or heat are used to cure the deposited samples.

Information about the test films or samples in batches on the build plate 404 is obtained from the load cell 420 and environmental sensors 408 and data 422 is provided to the computer with database and experimental planner 418. Environmental sensors can be used in tandem with controlled environments 424 such as oven heating, electromagnetic irradiation, humidifier, and non-ambient gas flow environments.

Automated software in the computer with database and experimental planner 418 takes data obtained from previous batches to dictate next batch printed 416.

The above steps are repeated until done (when substrate is filled or no more space—Applicant contemplates up to 100 samples in a single screening).

More Detailed Description of Operation of FIG. 4

Prior to deposition, sample materials of interest are first loaded into the inlets 410, 412, and 414. Note that FIG. 4 shows three inlets; however, more inlets are contemplated and only three are shown for illustrative purposes. Each of these inlets will include samples. Once the inlets 410, 412, 414 are loaded, and mixed to the desired formulation, the test samples will be deposited on the build plate 404 providing test films or samples in batches. The deposited sample composition 404 is controlled through the apparatus, varying the ratio between inlets into the deposition nozzle 406. The ratios of inlets can be kept constant or varied throughout testing, producing deposited materials with homogeneous, heterogenous, and graded compositions.

Mixing of the components within the deposition nozzle 406 can be achieved through static or active mixing techniques. The deposition nozzle 406 may include shear, pressure, and thermal inputs to enable deposition and analysis of the mixed resin formulations 404.

Mixed formulations are deposited onto the build plate 402. Deposited samples can include liquids, gels, pastes, and thermoplastics. Probe head 406 and build plate 402 inputs, controlled environment inputs 424, and measurements 420 and 408 information are controlled and recorded as data 422 within the computer and its respective software 418. This data is kept for each print and formulation tested. Applicant's apparatus, systems, and methods 400 provide screening of the tuned mechanical strength of 3D printed materials to determine parameters for targeted applications.

The experimental planner for this system 400 is used to control the inlet feed ratios during screening. Between tests, machine learning models that are used in the apparatus software are improved through analysis of the full living database of previous test materials screened. Machine learning models include, but are not limited to Bayesian optimization, random forest, and Gaussian processes, as well as large data models including neural networks. During deposition and testing, the latest model is used to analyze the data from the first batch of testing. From this data, a new batch of formulations to test is generated, and printing continues. This new batch data is coupled to the previous batches to generate the following batch for further testing. In other words. all data generated during a test is used to make the new batch of testing, until testing is completed. Then this data is once again added to the database and used to improve the experimental planner. Critically, this planner enables full automation of the materials formulation screening, homing in on desirable properties from the characterization and measurement data during testing.

Tuning Mechanical Strength 3D Printed Materials Screening

Figure 5:
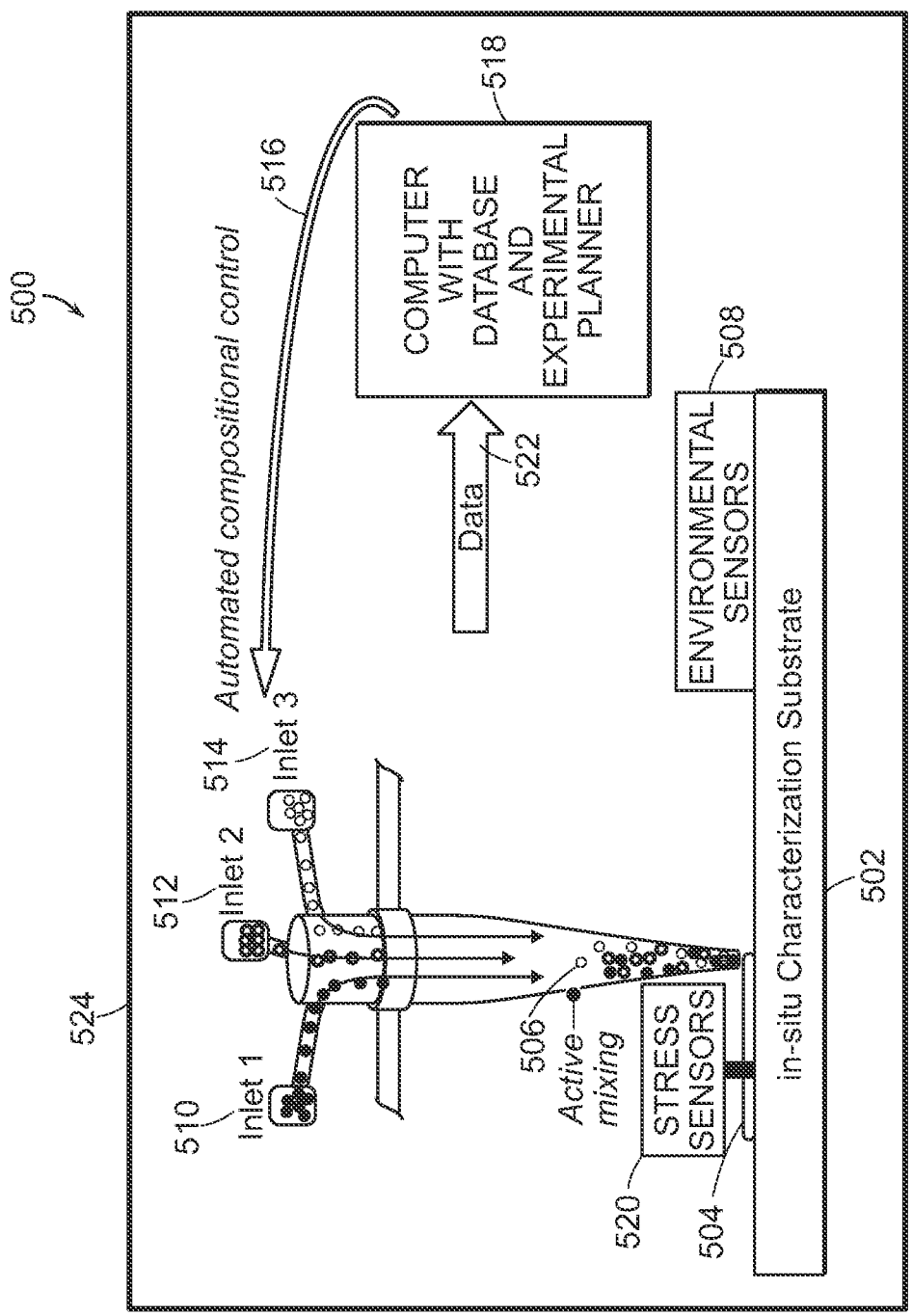
FIG. 5 is an illustration of tuning mechanical strength and other thermomechanical properties for 3D printed materials screening.

Referring now to FIG. 5, an illustrative view shows yet another embodiment of Applicant's apparatus, systems, and methods. This embodiment is identified generally by the reference numeral 500. The components of Applicant's apparatus, systems, and methods 500 illustrated in FIG. 5 are listed below:

The components of Applicant's apparatus, systems, and methods 500 illustrated in FIG. 5 are listed below:
  Reference Numeral No. 502—Build Plate,
  Reference Numeral No. 504—Deposited Formulation,
  Reference Numeral No. 506—Mixing and Deposit Head,
  Reference Numeral No. 508—Environmental Sensors,
  Reference Numeral No. 510—Inlet 1,
  Reference Numeral No. 512—Inlet 2,
  Reference Numeral No. 514—Inlet 3,
  Reference Numeral No. 516—Automated Compositional Control,
  Reference Numeral No. 518—Computer with database and experimental planner,
  Reference Numeral No. 520—Stress Sensors, and
  Reference Numeral No. 522—Data from Probe Head and Stress Sensors and Environmental Sensors.
  Reference Numeral No. 524—Controlled environment The description of the structural components of the Applicants' apparatus, systems, and methods 500 having been completed, the operation and additional description of the Applicant's apparatus, systems, and methods will now be considered in greater detail.

General Description of Operation of FIG. 5

Applicants' apparatus, systems, and methods 500 provides tuning mechanical strength and other thermomechanical properties for 3D printed materials screening.

Test sample formulations are loaded into inlets 510, 512, and 514. The deposited sample 504 can be test films or 3D samples.

The test sample formulations are mixed in the nozzle and deposit head 506 and the test samples are deposited on the build plate 504 providing test films or samples in batches. Deposited samples may be standalone materials, or may be cured during or after deposition through stimulus such as electromagnetic irradiation, acoustic wave, electric current, heat, and chemical crosslinking or interactions. Traditionally, light or heat are used to cure the deposited samples.

Information about the test films or samples in batches on the build plate 504 is obtained from the Stress Sensors 520 and environmental sensors 508 and data 522 is provided to the computer with database and experimental planner 518. Environmental sensors can be used in tandem with controlled environments 524 such as oven heating, electromagnetic irradiation, humidifier, and non-ambient gas flow environments.

Automated software in the computer with database and experimental planner 518 takes data obtained from previous batches to dictate next batch printed 516.

The above steps are repeated until done (when substrate is filled or no more space—Applicant contemplates up to 100 samples in a single screening).

More Detailed Description of Operation of FIG. 5

Prior to deposition, sample materials of interest are first loaded into the inlets 510, 512, and 514. Note that FIG. 5 shows three inlets; however, more inlets are contemplated and only three are shown for illustrative purposes. Each of these inlets will include samples. Once the inlets 510, 512, 514 are loaded, and mixed to the desired formulation, the test samples will be deposited on the build plate 504 providing test films or samples in batches. The deposited sample composition 504 is controlled through the apparatus, varying the ratio between inlets into the deposition nozzle 506. The ratios of inlets can be kept constant or varied throughout testing, producing deposited materials with homogeneous, heterogenous, and graded compositions.

Mixing of the components within the deposition nozzle 506 can be achieved through static or active mixing techniques. The deposition nozzle 506 may include shear, pressure, and thermal inputs to enable deposition and analysis of the mixed resin formulations 504.

Mixed formulations are deposited onto the build plate 502. Deposited samples can include liquids, gels, pastes, and thermoplastics. Deposited samples may be standalone materials, or may be cured during or after deposition through stimulus such as electromagnetic irradiation, acoustic wave, electric current, heat, and chemical crosslinking or interactions. Traditionally, light or heat are used to cure the deposited samples. Probe head 506 and build plate 502 inputs, controlled environment inputs 524, and measurements 520 and 508 information are controlled and recorded as data 522 within the computer and its respective software 518. This data is kept for each print and formulation tested. Applicant's apparatus, systems, and methods 500 provide screening of the tuned mechanical strength and other thermomechanical properties of 3D printed materials to determine parameters for targeted applications.

The experimental planner for this system 500 is used to control the inlet feed ratios during screening and is implemented through machine learning models. Machine learning models include, but are not limited to Bayesian optimization, random forest, and Gaussian processes, as well as large data models like feed-forward neural networks. During deposition and testing, the latest model is used to analyze the data from the first batch of testing. From this data, a new batch of formulations to test is generated, and printing continues. This new batch data is coupled to the previous batches to generate the following batch for further screening. In other words. all data generated during a test is used to make the new batch of testing, until testing is completed. Then this data is once again added to the database and used to improve the experimental planner and machine learning models. Critically, this planner enables full automation of the materials formulation screening, homing in on desirable properties from the characterization and measurement data during testing.

Long-Term Cell Culture Study

Figure 6:
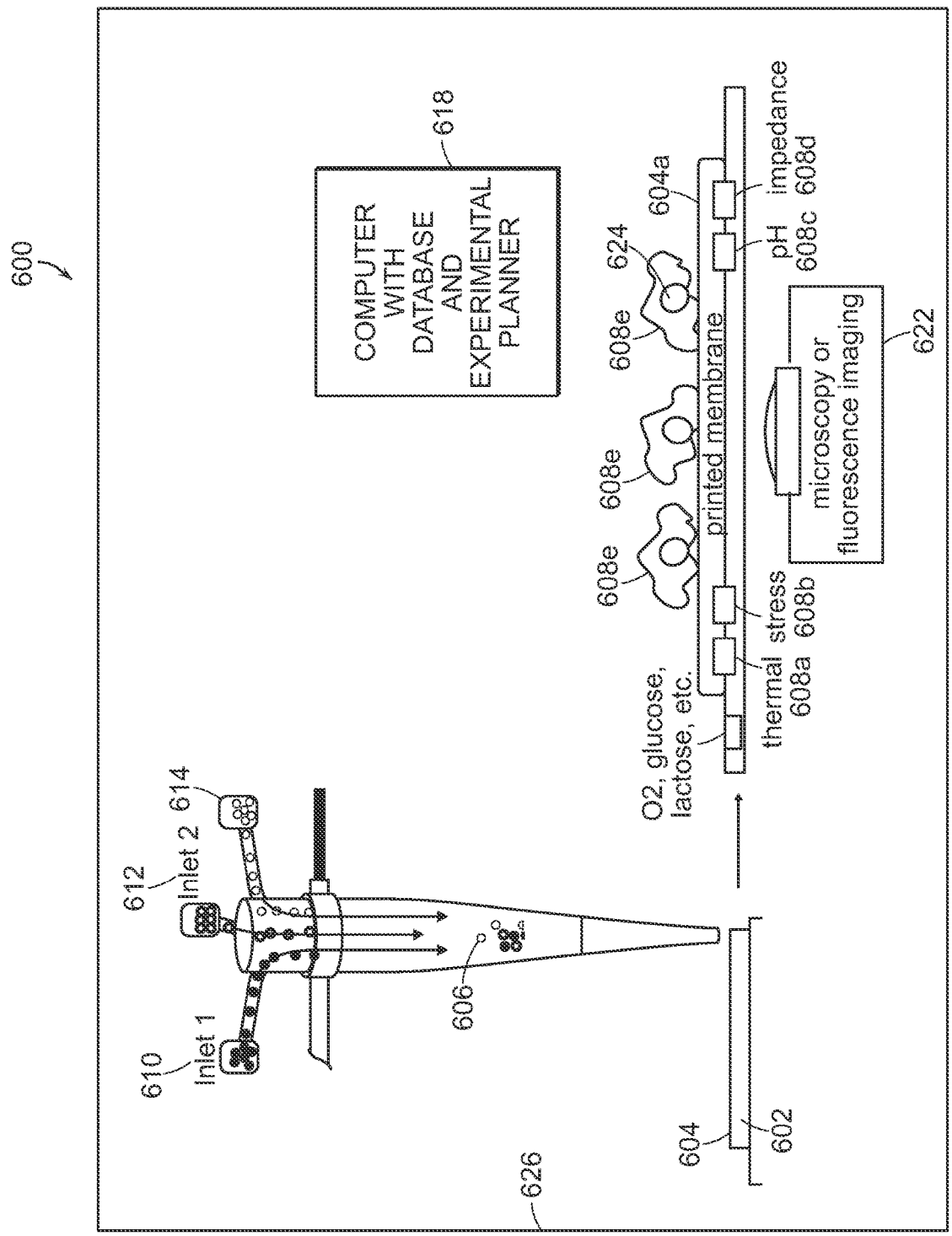
FIG. 6 is an illustration of a screening system for screening a material.

Referring now to FIG. 6, an illustrative view shows another embodiment of Applicant's apparatus, systems, and methods. This embodiment is identified generally by the reference numeral 600. The components of Applicant's apparatus, systems, and methods 600 illustrated in FIG. 6 are listed below:
  Reference Numeral No. 602—Build Plate,
  Reference Numeral No. 604—Deposited Formulation,
  Reference Numeral No. 606—Mixing and Deposit Head,
  Reference Numeral No. 608a—Thermal Sensors,
  Reference Numeral No. 608b—Stress Sensors,
  Reference Numeral No. 608c—pH Sensors,
  Reference Numeral No. 608d—Impedance Sensors, Reference Numeral No. 608e—$O_2$, Glucose, Lactate Sensors,
Reference Numeral No. 610—Inlet 1,
Reference Numeral No. 612—Inlet 2,
Reference Numeral No. 614—Inlet 3,
Reference Numeral No. 618—Computer with database and experimental planner,
Reference Numeral No. 622—Microscopy or Fluorescence Imaging,
Reference Numeral No. 624—Cells
Reference Numeral No. 626—Environmental chamber The description of the structural components of the Applicants' apparatus, systems, and methods 600 having been completed, the operation and additional description of the Applicant's apparatus, systems, and methods will now be considered in greater detail.

Applicants' apparatus, systems, and methods 600 provides materials screening.

Test sample formulations are loaded into inlets 610, 612, and 614. The deposited sample 604 can be test films or 3D samples.

The test sample formulations are mixed in the nozzle and deposit head 606 and the test samples are deposited on the build plate 604 providing test films or samples in batches. Cells 624 can be seeded directly into the test sample formulations or cultured onto the deposited films 604 after printing. After printing, build plate 602 with samples is transferred to an environmental chamber 626 for continued study.

Information about the test films or samples in batches on the build plate 604 and the cell culture environment 624 is obtained from the Thermal Sensors 608a, Stress Sensors 608b, pH Sensors 608c, Impedance Sensors 608d, and/or $O_2$, Glucose, Lactate Sensors 608e, and data is provided to the computer with database and experimental planner 618. In addition to measurements taken directly at printing, these sensors can be utilized to monitor samples and cell culture over time. Automated software in the computer with database and experimental planner 618 takes data obtained from previous batches to dictate next batch printed. Multiple build plates 602 can be loaded into the environmental chamber 626 at the same time, providing continued study of multiple screenings over prolonged periods of study.

The above steps are repeated until done (when substrate is filled or no more space—Applicant contemplates up to 100 samples in a single screening, multiple screenings per environmental chamber).

Environmental, Permeability, and Sample Aging Studies

Figure 7A:
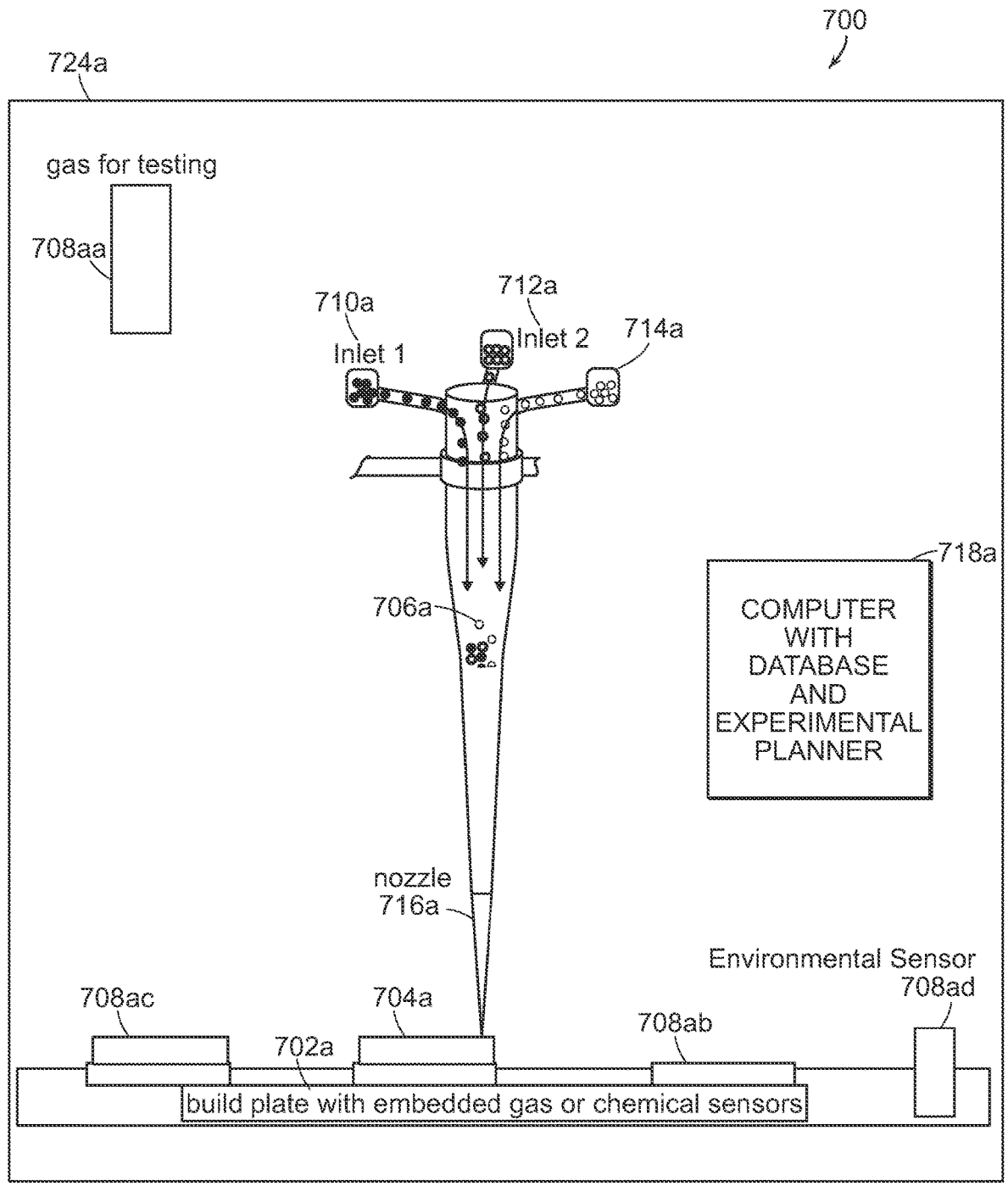
FIG. 7A is an illustration of another embodiment of a screening system for screening a material.

Referring now to FIG. 7A, an illustrative view shows another embodiment of Applicant's apparatus, systems, and methods. This embodiment is identified generally by the reference numeral 700a. The components of Applicant's apparatus, systems, and methods 700a illustrated in FIG. 7A are listed below:

The components of Applicant's apparatus, systems, and methods 700a illustrated in FIG. 7a are listed below:
Reference Numeral No. 702a—Build Plate,
Reference Numeral No. 704a—Deposited Formulation,
Reference Numeral No. 706a—Mixing and Deposit Head,
Reference Numeral No. 708aa—Gas for Testing,
Reference Numeral No. 708ab—Sensors for Gas or Chemical,
Reference Numeral No. 708ac—Additional Sensors for Testing or Stimulus for Aging Study,
Reference Numeral No. 708ad—Environmental Sensors,
Reference Numeral No. 710a—Inlet 1,
Reference Numeral No. 712a—Inlet 2,
Reference Numeral No. 714a—Inlet 3,
Reference Numeral No. 716a—Nozzle,
Reference Numeral No. 718a—Computer with database and experimental planner, and
Reference Numeral No. 724a—Controlled environment The description of the structural components of the Applicants' apparatus, systems, and methods 700a having been completed, the operation and additional description of the Applicant's apparatus, systems, and methods will now be considered in greater detail.

Applicants' apparatus, systems, and methods 700a provides materials screening.

Test sample formulations are loaded into inlets 710a, 712a, and 714a. The deposited sample 704a can be test films or 3D samples.

The test sample formulations are mixed in the nozzle and deposit head 706a and the test samples are deposited on the build plate 704a providing test films or samples in batches. Deposited samples may be standalone materials, or may be cured during or after deposition through stimulus such as electromagnetic irradiation, acoustic wave, electric current, heat, and chemical crosslinking or interactions. Traditionally, light or heat are used to cure the deposited samples.

Information about the test films or samples in batches on the build plate 704a is obtained in relation to responses to Gas, Chemicals, Stimulus, etc. 708aa. This includes gas and chemical permeability studies, aging studies, and stimuli-responsive material studies, for example. Sample responses are measured through embedded gas and chemical sensors 708ab. In addition, other embedded or drop-down sensors and stimuli may be incorporated for further testing 708ac, such as stress and thermal sensors, impedance sensors or electrode arrays, and imaging. With a controlled environment 724a, measurements can be made at initial printing, as well as over time through continued study. Controlled environment can be envisioned as being present both around the deposition apparatus 700a, as well as an external chamber for continued study after deposition. The external chamber also enables continued study of multiple screenings at the same time.

Automated software in the computer with database and experimental planner 718a takes data obtained from previous batches to dictate next batch printed.

The above steps are repeated until done (when substrate is filled or no more space—Applicant contemplates up to 100 samples in a single screening, multiple screenings studied over time simultaneously).

Figure 7B:
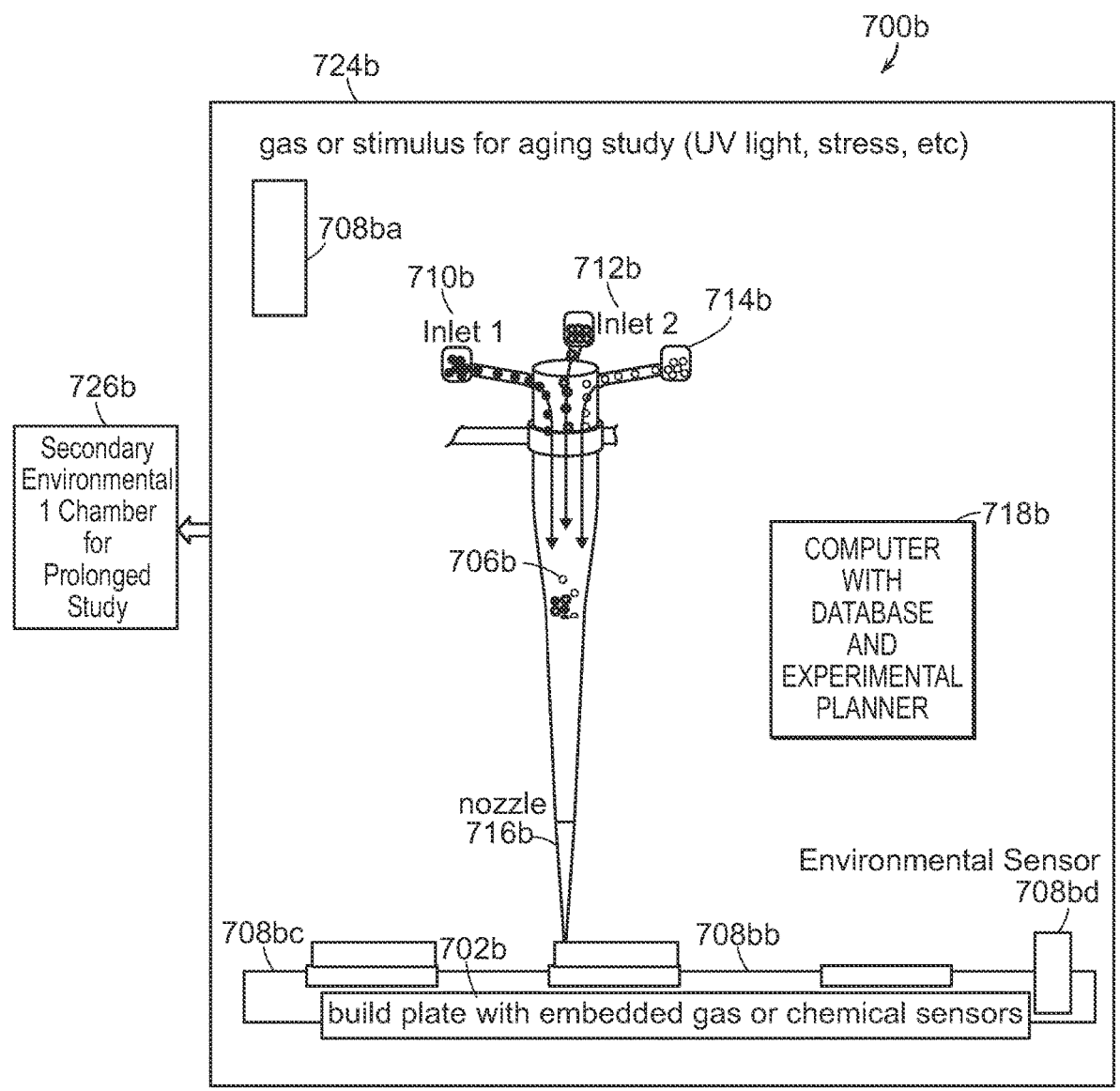
FIG. 7B is an illustration of yet another embodiment of a screening system for screening a material.

Referring now to FIG. 7B, an illustrative view shows another embodiment of Applicant's apparatus, systems, and methods. This embodiment is identified generally by the reference numeral 700b. The components of Applicant's apparatus, systems, and methods 700b illustrated in FIG. 7B are listed below:
Reference Numeral No. 702b—Build Plate,
Reference Numeral No. 704b—Deposited Formulation,
Reference Numeral No. 706b—Mixing and Deposit Head,
Reference Numeral No. 708ba—Gas or Stimulus for Curing, and/or Gas or Stimulus for Aging Study (UV light, stress, etc),
Reference Numeral No. 708bb—Sensors for Gas or Chemical, Reference Numeral No. 708*bc*—Additional Sensors for Testing or Stimulus for Aging Study,
Reference Numeral No. 708*bd*—Environmental Sensors,
Reference Numeral No. 710*b*—Inlet 1,
Reference Numeral No. 712*b*—Inlet 2,
Reference Numeral No. 714*b*—Inlet 3,
Reference Numeral No. 716*b*—Nozzle,
Reference Numeral No. 718*b*—Computer with database and experimental planner,
Reference Numeral No. 724*b*—Controlled environment, and
Reference Numeral No. 724*b*—Secondary chamber for prolonged study.
Reference Numeral 726*b*—Secondary environmental chamber for continued study.

The description of the structural components of the Applicants' apparatus, systems, and methods 700*b* having been completed, the operation and additional description of the Applicant's apparatus, systems, and methods will now be considered in greater detail.

Applicants' apparatus, systems, and methods 700*b* provides materials screening.

Test sample formulations are loaded into inlets 710*b*, 712*b*, and 714*b*. The deposited sample 704*b* can be test films or 3D samples.

The test sample formulations are mixed in the nozzle and deposit head 706*b* and the test samples are deposited on the build plate 704*b* providing test films or samples in batches. Deposited samples may be standalone materials, or may be cured during or after deposition through stimulus such as electromagnetic irradiation, acoustic wave, electric current, heat, and chemical crosslinking or interactions 708*ba*. Traditionally, light or heat are used to cure the deposited samples.

Information about the test films or samples in batches on the build plate 704*b* is obtained in relation to responses to Gas, Chemicals, Stimulus, or Gas for Age Study Testing or Stimulus for Aging Study (UV light, humidity, stress, heat, etc,) 708*ba*. This includes gas and chemical permeability studies, aging studies, and stimuli-responsive material studies, for example. Sample responses are measured through embedded gas and chemical sensors 708*bb*. In addition, other embedded or drop-down sensors and stimuli may be incorporated for further testing 708*bc*, such as stress and thermal sensors, impedance sensors or electrode arrays, and imaging. With a controlled environment 724*b*, measurements can be made at initial printing, as well as over time through continued study. Controlled environment can be envisioned as being present both around the deposition apparatus 700*b*, as well as an external chamber for continued study after deposition. The external chamber also enables continued study of multiple screenings at the same time.

Automated software in the computer with database and experimental planner 718*b* takes data obtained from previous batches to dictate next batch printed.

The above steps are repeated until done (when substrate is filled or no more space—Applicant contemplates up to 100 samples in a single screening, multiple screenings studied over time simultaneously). A Secondary chamber 724*b* is provided for prolonged study.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A screening method for screening a material, comprising the steps of:
   providing computer with a database and an experimental planner subsystem;
   using the computer to control a composition of a plurality of different constituents being loaded from a plurality of separate inlets into a mixing device;
   providing mixing direct-ink-writing of the constituents to form the material, providing in situ characterization substrates or probes that receive the material;
   the in situ characterization substrates or probes including printing multiple films on said substrates or probes, wherein said multiple films have differing sets of the constituent materials; and experimental planner subsystem employing active learning planning for screening the material and to use the multiple films and active machine learning to generate a new, improved set of constituents for use, by further controlling an admission of additional constituents through the plurality of separate inlets, in a subsequent printing operation.

2. The screening method of claim 1,
wherein said step of providing active learning planning for screening the material includes using the active machine learning to analyze said set of constituents and to dictate a next batch of films to achieve improved additional sets of constituents.

3. The screening method of claim 2,
wherein said step of providing mixing direct-ink-writing comprises active mixing or static mixing direct-ink-writing of five to ten films.

4. The screening method of claim 2,
wherein said step of providing mixing direct-ink-writing comprises active mixing or static mixing direct-ink-writing of one to twenty films.

5. A material screening method comprising the steps of:
using a computer to control an admission of constituent materials through different material inlets into a nozzle for subsequent mixing to provide multiple differing material samples including a first material sample, a second sample material and additional material samples;
mixing said first, second and additional material samples, thereby producing multiple sample batches comprising a first sample batch, a second sample batch, and additional sample batches;
depositing said first, second and additional sample batches on a substrate in multiple group deposits comprising a first group deposit containing said first sample batch, a second group deposit containing said second sample batch, and additional group deposits containing said additional sample batches;
scanning said group deposits producing multiple data scan units comprising a first data scan unit comprising said first sample batch, a second data scan unit comprising said second sample batch, and additional data scan units comprising said additional sample batches;
establishing desired material characteristics comprising first desired material characteristic, second desired material characteristic, and additional desired material characteristics;
analyzing and comparing said multiple data scan units and said desired material characteristics;
rating said multiple material samples according to said desired material characteristics; and
using an experimental planning machine employing learning to analyze said ratings to generate information for creating a new sample batch having an improved material characteristic.

6. The material screening method of claim 5 wherein said multiple material samples are polymer material samples.

7. The material screening method of claim 5 wherein said multiple material samples are composite material samples.

8. The material screening method of claim 5 wherein said multiple material samples are battery polymer material samples.

9. The material screening method of claim 5 wherein said multiple material samples are Lithium ion battery material samples.

10. The material screening method of claim 5 wherein said multiple material samples are Lithium metal battery material samples.

11. The material screening method of claim 5 wherein said first desired material characteristic is viscosity or impedance or thermomechanical properties, wherein said second desired material characteristic is viscosity or impedance or thermomechanical properties, and wherein said additional desired material characteristic is viscosity or impedance or thermomechanical properties.

12. The material screening method of claim 11 wherein said first desired material characteristic is viscosity, wherein said second desired material characteristic is viscosity, and wherein said additional desired material characteristic is viscosity.

13. The material screening method of claim 11 wherein said first desired material characteristic is impedance, wherein said second desired material characteristic is impedance, and wherein said additional desired material characteristic is impedance.

14. The material screening method of claim 11 wherein said first desired material characteristic is thermomechanical properties, wherein said second desired material characteristic thermomechanical properties, and wherein said additional desired material characteristic is thermomechanical properties.

15. The material screening method of claim 5 further comprising the step of curing said multiple group deposits.

16. A material screening apparatus, comprising:
an in-situ characterization substrate,
a test formulation deposited on said substrate,
a mixing and deposit head,
a probe head,
a first inlet in communication with said mixing and deposit head,
a second inlet in communication with said mixing and deposit head,
a third inlet in communication with said mixing and deposit head,
an automated compositional control,
a computer with a database and experimental planner software, the computer controlling a composition of constituents independently through each of the first, second and third inlets into the mixing and deposition head;
the test formulation generating first data acquired from said substrate, and
second data acquired from said probe head; and
the computer with the database and the experimental planner software using the first and second data to provide information for formulating an additional test formulation, applied through the first, second and third inlets, which is different from the test formulation.

17. The material screening apparatus of claim 16 further comprising a photocuring light source and photocuring light from said photocuring light source.

18. The material screening apparatus of claim 16 further comprising a controlled environment for the material screening apparatus.

19. The material screening apparatus of claim 16 further comprising environmental sensors.

20. The material screening apparatus of claim 16 further comprising a thermal sensor.

21. The material screening apparatus of claim 16 further comprising a stress sensor.

22. The material screening apparatus of claim 16 further comprising a pH sensor.

23. The material screening apparatus of claim 16 further comprising an impedance sensor.

24. The material screening apparatus of claim 16 further comprising an oxygen sensor.

25. The material screening apparatus of claim 16 further comprising a glucose sensor.

26. The material screening apparatus of claim 16 further comprising a lactate sensor.

27. The material screening apparatus of claim 16 further comprising a gas sensor.

* * * * *